United States Patent [19]

Butler et al.

[11] 4,400,496

[45] Aug. 23, 1983

[54] WATER-SOLUBLE GRAFT COPOLYMERS OF STARCH-ACRYLAMIDE AND USES THEREFOR

[75] Inventors: George B. Butler; Thieo E. Hogen-Esch, both of Gainesville, Fla.; John J. Meister, Dallas, Tex.; Huey Pledger, Jr., Gainesville, Fla.

[73] Assignee: University of Florida, Tallahassee, Fla.

[21] Appl. No.: 188,999

[22] Filed: Sep. 22, 1980

[51] Int. Cl.³ ........................ C08F 251/00; C08L 3/12
[52] U.S. Cl. .................................... 527/312; 527/313
[58] Field of Search ............... 260/17.4 GC, 17.4 UC, 260/17.4 ST, 17 A; 527/311, 312, 313, 314

[56] References Cited

U.S. PATENT DOCUMENTS 3,095,391  6/1963  Brockway et al. ......... 260/17.4 GC
3,332,897  7/1967  Ray-Chaudhuri .......... 260/17.4 GC

OTHER PUBLICATIONS

Handbook of Water-Soluble Gums and Resins, Davidson, (1980), pp. 22-7 to 22-17.
G. F. Fanta, R. C. Burr, W. M. Doane, and C. R. Russell, *J. Appl. Polym. Sci.*, 15, 2651 (1971).
"Starch, Graft Copolymers", *Encyclopedia of Polymer Science and Technology*, 1977, vol. 2, pp. 665-699.

*Primary Examiner*—John Kight, III
*Assistant Examiner*—Nathan M. Nutter
*Attorney, Agent, or Firm*—Arthur G. Yeager

[57] ABSTRACT

Graft copolymers having starch as the central chain with grafted side chains of acrylamide or acrylamide-acrylic acid, and a process for preparation of such copolymers in the presence of $Ce^{+4}$ or other redox initiators. These copolymers are employed in preparing highly viscous aqueous solutions that are particularly useful in oil recovery from subterranean wells.

5 Claims, 2 Drawing Figures

WATER-SOLUBLE GRAFT COPOLYMERS OF STARCH-ACRYLAMIDE AND USES THEREFOR

GOVERNMENTAL RIGHTS

The Government has rights in this invention pursuant to Contract Number DE A 505 78ERO5947 awarded by the U.S. Department of Energy.

BACKGROUND OF THE INVENTION

This invention relates to graft copolymers of starch-acrylamide or starch-acrylamide-acrylic acid which have the property of producing highly viscous aqueous solutions that are particularly useful in recovering oil from subterranean formations.

After the primary supply of oil in a well has been exhausted it has been a common practice in the past to employ any of several secondary techniques to recover oil from the cracks and interstices in the underground rock formations. One technique has been to flood the well with water so as to displace the oil. In more recent times attempts have been made to add a material to the water to produce an even greater recovery of oil. In another technique a liquid is pumped into the well and maintained under a high enough pressure to fracture the underground rock formations and thereby releasing more oil to be recovered. These two techniques can be enhanced by the incorporation of appropriate materials into the liquid. It is an object of this invention to provide solutions of copolymeric materials which greatly facilitate the oil recovery procedure and increase the amount of oil recovered.

BRIEF SUMMARY OF THE INVENTION

This invention provides to a water-soluble graft copolymer comprising a backbone molecule of starch with branch chains grafted thereto of polymerized acrylamide units or a mixture of polymerized acrylamide units and polymerized acrylic acid units. There is also provided a process of preparing this copolymer by reacting acrylamide and starch, both dissolved in deoxygenated water, in the presence of an ion of cerium, manganese, or vanadium as a polymerization initiator. Other embodiments of this invention relate to methods of using the above copolymer in recovering oil from subterranean formations by flooding and by fracturing procedures; and a method of reducing friction of flowing water by incorporating the copolymer into the flowing water.

BRIEF DESCRIPTION OF THE DRAWINGS

In the attached drawings

DETAILED DESCRIPTION OF THE INVENTION

Figure 1:
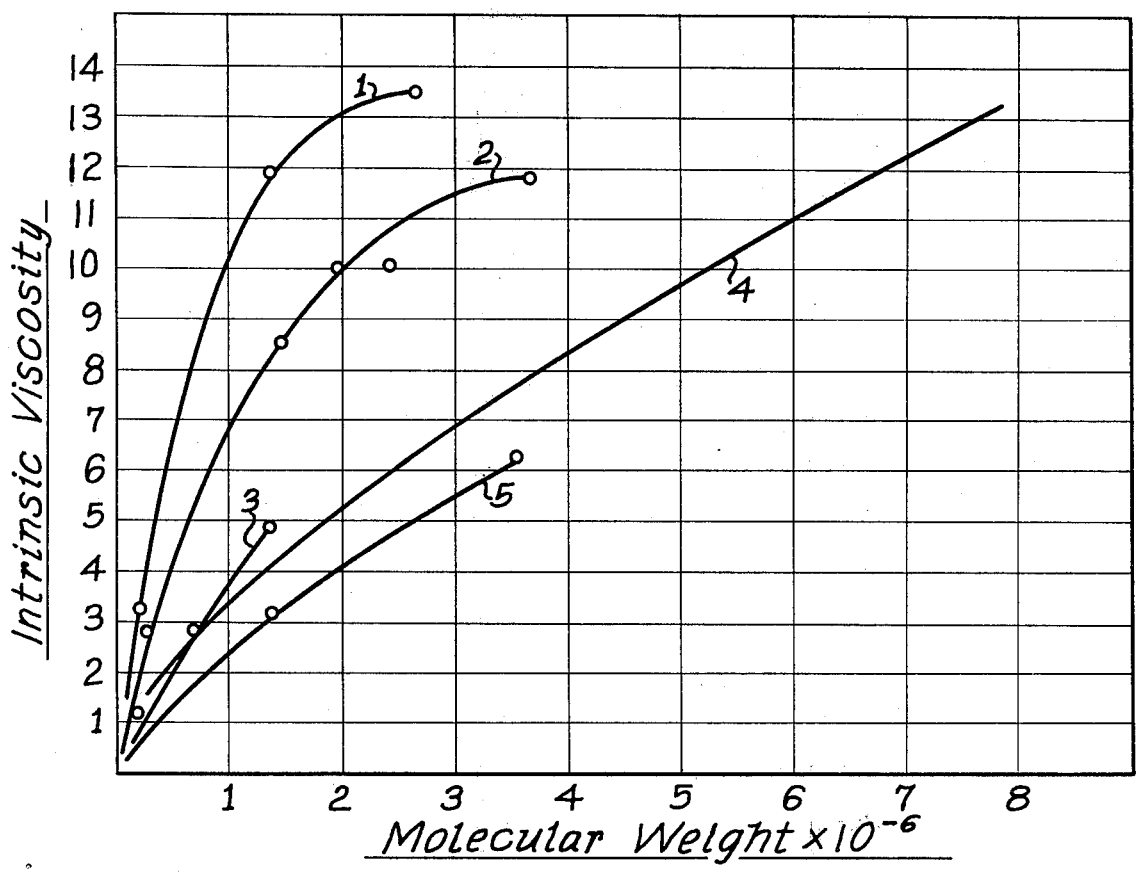
FIG. 1 is a plot of intrinsic viscosity versus molecular weight of the graft copolymers of this invention compared to a homopolymer of acrylamide.

In accordance with the invention, there is provided a high molecular weight graft copolymer containing starch as the backbone and polyacrylamide or poly(acrylamide-acrylic acid) as grafted side chains. Starch is derived from such crops as corn, wheat, yams, or potatoes. It is a white, tasteless, odorless, granular solid and is classed chemically as a complex carbohydrate. Certain natural starches and certain fractions of starch are soluble in water. It is this class of materials, those capable of forming aqueous solutions, that are employed in this invention. The macromolecule of the water soluble starch is composed of glucose units joined $\alpha$-1,4'. The repeating unit of the chemical formula of water soluble starch is:

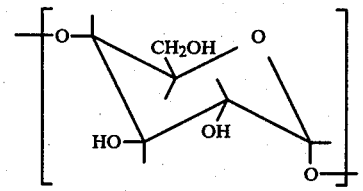

To this starch macromolecule is grafted repeating units of acrylamide

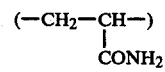

alone or in combination with repeating units of acrylic acid

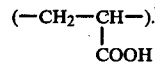

The preparation of this copolymer is accomplished in general under oxygen-free conditions by adding acrylamide to an aqueous starch solution followed by the addition of a polymerization initiator and allowing time for graft polymerization to occur. When acrylic acid units are desired a previously prepared graft copolymer of starch-acrylamide is subjected to hydrolysis conditions capable of converting some of the amide units to carboxylic acid units.

To a container of appropriate size containing a mechanical stirrer and inert gas inlet is added between 2 and 75 parts by weight of starch per 1000 parts distilled or deionized water. The mixture is heated to 85°-95° C. with stirring, to dissolve the starch. Certain fractions or types of starch require heating to temperatures as high as 150° C. under pressures as high as 15 psig to dissolve the starch in water. If such a starch is used, these temperature and pressure conditions should be applied for at least 30 minutes. After dissolution, the mixture is allowed to cool to 25° C. while being stirred and bubbled with an inert gas such as nitrogen, helium, neon, argon, krypton, or xenon. Between 5 and 400 parts, preferably between 70 and 225 parts, by weight of acrylamide are added to the reaction mixture per 1000 parts water. The system is then deoxygenated for about 30 minutes by bubbling with an inert gas. Certain impurities present in commerically-available acrylamide may inhibit or prevent the copolymerization, and it is therefore preferred that acrylamide be used that has been freshly recrystallized from trichloromethane and vacuum dried.

The preferred polymerization initiator is ceric ion ($Ce^{+4}$). Other initiators that may be used include vanadium ($V^{+5}$) or manganese ions ($Mn^{+3}$, $Mn^{+4}$, $Mn^{+7}$). It is preferred that the physical form of the initiator be an acidic aqueous solution. Preferably the initiator is a 0.001 to 0.1 molar aqueous solution of ceric ammonium nitrate, $Ce(NH_4)_2 (NO_3)_6$, in 0.001 to 1.0 molar nitric acid. Other acid soluble cerium salts, however, can be used. Between 0.01 and 7 parts of this ceric ion initiator solution is added to the above reaction mixture and the mixture is stirred for 1 minute.

The graft copolymerization reaction can be conducted with or without stirring once the initiator has been dispersed in the reaction mixture. The reaction is allowed to proceed for 1 to 200 hours, with 48 hours being a typical reaction time. It is preferred to terminate the copolymerization by addition of a free radical scavenger such as hydroquinone.

If it is preferred to form poly(acrylamide-acrylic acid)-starch graft copolymer by replacing a fraction of the acrylamide in the above procedure with acrylic acid, it is best accomplished by hydrolyzing some of the amide groups of the polyacrylamide-starch graft copolymer, preferably with a base, such a sodium hydroxide or with acid, such as nitrous acid.

The graft copolymer is easily recovered from a liquid reaction mixture. If the reaction mixture is a gel it can be made pourable by mixing with 5 to 8 times its volume of distilled or deionized water under low shear conditions until a homogeneous, pourable system is formed. The reaction mixture is added to 2-50, preferably 5-30, times its volume of a nonsolvent for the copolymer, such as acetone. Preferably the nonsolvent is stirred vigorously so as to form a vortex and the copolymer solution is slowly drained directly into the center of this vortex. The precipitated graft copolymer is then removed from the nonsolvent solution by filtration, washed with nonsolvent, filtered, and vacuum-dried to a constant weight.

The amount of all save one of the components of the reaction mixture can be varied within reasonable limits of those given in this description. The acrylamide concentration of the reaction mixture should remain between 5 parts and 400 parts, preferably 70 to 225 parts per 1000 parts by weight of reaction medium. Copolymers having the high molecular weight needed for efficient water viscosification in oil recovery may not be formed in reaction mixtures with acrylamide concentrations beyond these limits.

The following examples illustrate certain embodiments of this invention wherein parts and percentages are by weight and temperatures are in centigrade unless otherwise indicated. Pfaltz and Bauer starch, catalog number SO8583, and Eastman reagent-grade acrylamide were used in these syntheses.

EXAMPLE 1

A 50 ml. Erlenmeyer flask containing 25 ml. of deionized, distilled water and 0.336 g of starch was heated to 95° C. and stirred for 30 minutes. The flask was allowed to cool to 25° C. and 2.91 g of recrystallized and vacuum dried acrylamide and 15 ml. of deionized, distilled water were added. The system was sparged with argon for 30 minutes and capped with a serum cap. The initiator solution was made by dissolving 1.3703 g of ceric ammonium nitrate in 20 ml of 1 molar nitric acid contained in a 25 ml volumetric flask. The flask was then filled to its volume mark with 1 molar nitric acid to form a 0.0999 molar solution of ceric ion, $Ce^{+4}$, in 1 molar nitric acid. Using a syringe, 0.041 ml of the initiator solution was injected into the reaction mixture and the mixture was stirred for 1 minute. The flask was placed in a constant temperature bath held at 30° C. and allowed to react for 48 hours. The reaction mixture was stirred for one minute every one-half hour until the mixture became too viscous to stir. The addition of 0.5 ml of deionized water saturated with hydroquinone terminated the reaction. The reaction mixture was mixed with 250 ml of deionized water until the system was homogeneous.

Dropwise addition of 250 ml. of acetone to the dilute, viscous solution of copolymer caused the solution to become cloudy and nonviscous. The mixture was then slowly poured into 2.5 liters of acetone to precipitate the copolymer. The white, fibrous copolymer was removed from the acetone by filtration, washed with 200 ml. of acetone, and placed in a high speed, Waring laboratory blender with 300 ml. of acetone. The mixture was beaten for 3 seconds to pulverize the copolymer and the resulting slurry was filtered. The copolymer was dried under vacuum at room temperature. The product was 3.02 g of a copolymer of acrylamide grafted to starch and having an intrinsic viscosity of 10.6 dl/g.

EXAMPLE 2

To a 50 ml Erlenmeyer flask was added 25 ml of distilled, deionized water and 1.00028 g of starch. The flask and contents were heated to 80° C. and stirred for 30 minutes. When the flask and contents had cooled to 25° C., 4.27 g of acrylamide and 15 ml of distilled, deionized water were added. Argon was bubbled through the solution for 30 minutes before the flask was capped and 0.051 ml of the ceric ammonium nitrate solution, prepared as in Example 1, was added. The solution was stirred for one minute, and placed in a controlled temperature bath at 30° C. The sample was removed from the bath every 15 minutes and the reaction mixture stirred for one minute. After 45 minutes, the mixture was too viscous to stir and the sample was left undisturbed for another 71.25 hours. The reaction was terminated by the addition of 0.5 ml of water saturated with hydroquinone and the reaction mixture was placed in 300 ml of deionized water and stirred slowly for 3 days. A total of 230 ml of acetone was added dropwise to form a cloudy, nonviscous dispersion of copolymer in acetone and water. The dispersion was slowly added to 1.5 liters of vigorously stirred acetone. The precipitated copolymer was revovered from the acetone by filtration, placed in a covered beaker, and dried to constant weight under vacuum at 25° C. The product was 5.3 g of a copolymer of acrylamide grafted to starch and having an intrinsic viscosity of 12.4 dl/g.

EXAMPLE 3

In accordance with the general procedure of Example 1 there was reacted 4.26 g (0.06 mol) acrylamide and 0.4108 g. (0.00254 mol) of starch in the presence of 0.21 ml (0.0000021 mol) ceric ion ($Ce^{+4}$) initiator solution. The product was 3.84 g of a copolymer of acrylamide grafted to starch (82.2% yield). This copolymer had an intrinsic viscosity of 14.9 dl/g in deionized water and 14.1 dl/g. in 1 molar sodium nitrate solution.

To 198 ml. deionized water was added 1.6 ml. of 1 N sodium hydroxide (0.0016 mol), followed by 0.5 g of the above copolymer. The copolymer was dissolved by stirring, and the solution was then heated for 2 hours in a water bath held at 60.5° C. Ammonia evolved during this heating. The solution was then cooled and added dropwise to 2 liters of acetone causing precipitation of polymer solids. The polymer solids were removed by filtration, slurried in 500 ml. of acetone, filtered again, and vacuum dried under a pressure of 0.025 mm. Hg to produce 0.49 g of polymeric product having an intrinsic viscosity of 9.48 dl/g at 30° C. in 1 M solution of sodium nitrate.

The above polymeric product was then dissolved in deionized water and subjected to dialysis through a membrane which passed all materials having a molecular weight of less than 10,000 to the external fluid (deionized water) in which the membrane was immersed. The dialyzed solution was concentrated to 100 ml. under vacuum at 58°-60° C. The concentrate was added dropwise to 2 liters of acetone and recovered by filtering, slurring, and drying as described above to produce 0.11 g of a terpolymer of acrylic acid and acrylamide grafted to starch the terpolymer had an intrinsic viscosity of 47.0 dl/g in deionized water at 30° C. Theoretical calculations indicate that approximately 15–25% of the acrylamide group in the original copolymer were hydrolyzed to acrylic acid groups in the final terpolymer.

EXAMPLES 4–27

In a series of syntheses following the procedures of Examples 1 and 2 several graft copolymers were made with different amounts of the reaction components at various reaction conditions to produce graft copolymers with a range of molecular weights and a range of the number of grafted units of acrylamide on the starch macromolecule. The results are shown in Table 1.

The results set forth in Table 1 are all derived from standarized procedures, based on solutions of starch in 1 molar sodium nitrate brine. The intrinsic viscosities of all polymer solutions were determined at 30° C. using a Cannon-Finske #75 D259 viscometer with a viscometer constant of $7.338 \times 10^{-3}$ centistokes per second (30° C.). The intrinsic viscosities of a copolymer and of starch were determined by the procedure of plotting values of the natural logarithm of relative viscosity divided by concentration against concentration. The intrinsic viscosity is the value at zero concentration. Molecular weight of starch is calculated from the equation:

Intrinsic Viscosity $[\eta] = K \text{(Mol.Wt.)}^a$ where K and a are constants for a given polymer and solvent. For starch these constants are $K = 1.32 \times 10^{-4}$ dl/gm/atomic unit and $a = 0.68$. From the value of molecular weight of starch there can be calculated the average number of grafts of polyacrylamide on each starch molecule, (Ng), by dividing the moles ceric initiator by the moles of starch in the reaction mixture. The average number of monomer units in each grafted chain (Dp) is calculated by dividing the moles of acrylamide reacted by the moles of ceric initiator in the reaction medium. The molecular weight of the copolymer product is calculated from the following equation:

Mol. Wt. Copolymer = (71) (Ng) (Dp) + Mol.Wt. Starch

The intrinsic viscosities, calculated molecular weights, calculated number of grafts per starch molecule, and calculated average degree of polymerization of polyacrylamide side chain are given for a number of starch-acrylamide reaction products in Table 1. All of these copolymers possess the novel and original property that they are soluble in water and all copolymers containing more than 25 percent by weight acrylamide and/or acrylic acid are readily soluble in water at room temperature. Copolymers containing less than 25 percent acrylamide and acrylic acid may have to be dispersed in water warmed to between 30° and 50° C. to effect complete solution of the copolymer. These copolymers can be synthesized with calculated molecular weights varying from 300,000 to 20,000,000; calculated molecular weights of between 300,000 and 5,000,000 being readily achievable by the synthesis method described above. Intrinsic viscosities of between 0.5 and 20, calculated average degrees of polymerization per polyacrylamide chain of between 1 and 100,000, and calculated number of grafts per starch molecule of between 1 and 300 are all readily achieved.

It will be seen from the data in Table 1 that as the number of grafts per starch molecule (Ng) increases, the maximum obtainable value of the number of monomer units in each graft (Dp) decreases. The reaction temperature in all of Examples 4–27 was 30° C.

TABLE I

| SYNTHESIS DATA AND PROPERTIES OF STARCH-ACRYLAMIDE, GRAFT COPOLYMERS | | | | | | | | | | | |
|---|---|---|---|---|---|---|---|---|---|---|---|
| | | | | Ceric Ion | | Conditions | | | Calculated Product Properties[b] | | |
| Example Number | Acrylamide Added g Moles × 10² | | Water Soluble Starch Added g Moles[a] × 10³ | | Moles Ce⁺⁴ × 10⁵ | Solvent Volume (H₂O, ml) | Reaction Time (Hours) | [η] dl/g. | Molecular Weight × 10⁻⁶ | Dp | Ng | Percent Yield |
| 4 | 2.91 | 4.10 | 0.336 | 2.07 | 0.41 | 40 | 48 | 10.6 | 2.81 | 9,241 | 3.8 | 93.0 |
| 5 | 4.27 | 6.01 | 1.000 | 6.18 | 0.51 | 40 | 72 | 12.4 | 1.64 | 11,792 | 1.6 | 100 |
| 6 | 0.85 | 1.2 | 0.200 | 1.24 | 0.10 | 40 | 48 | 4.0 | 0.47 | 1,408 | 1.6 | 28.5 |
| 7 | 4.26 | 6.0 | 0.411 | 2.54 | 0.21 | 40 | 144 | 14.1 | 2.93 | 23,004 | 1.6 | 82.2 |
| 8 | 0.873 | 1.23 | 1.021 | 6.30 | 1.26 | 40 | 48 | 3.5 | 0.58 | 976 | 3.9 | 100 |
| 9 | 4.40 | 6.19 | 1.003 | 6.19 | 1.24 | 40 | 48 | 9.2 | 1.69 | 4,998 | 3.9 | 100 |
| 10 | 8.74 | 12.3 | 1.002 | 6.18 | 1.24 | 40 | 48 | 9.6 | 3.04 | 9,919 | 3.9 | 94.7 |
| 11 | 2.74 | 3.86 | 0.208 | 1.28 | 0.26 | 40 | 48 | 12.5 | 4.00 | 13,164 | 3.9 | 89.6 |
| 12 | 2.13 | 3.00 | 0.992 | 6.12 | 6.0 | 40 | 48 | 3.1 | 0.952 | 484 | 18.9 | 96.7 |
| 13 | 2.13 | 3.0 | 0.992 | 6.12 | 6.0 | 40 | 72 | 2.9 | 0.984 | 500 | 18.9 | 100 |
| 14 | 2.14 | 3.02 | 0.998 | 6.16 | 6.0 | 25 | 48 | 2.9 | 0.952 | 503 | 18.9 | 96.7 |
| 15 | 4.31 | 6.07 | 1.004 | 6.19 | 6.1 | 40 | 48 | 5.4 | 1.27 | 995 | 18.8 | 77.2 |
| 16 | 4.29 | 6.05 | 1.003 | 6.19 | 12.1 | 40 | 48 | 3.9 | 1.65 | 499 | 37.9 | 94.5 |
| 17 | 2.78 | 3.91 | 0.2114 | 1.30 | 2.6 | 120 | 96 | 6.9 | 3.85 | 1,289 | 38.6 | 86.6 |
| 18 | 4.26 | 6.0 | 0.667 | 4.12 | 12.8 | 40 | 48 | 2.2 | 2.31 | 470 | 60 | 100 |
| 19 | 4.26 | 6.0 | 0.445 | 2.74 | 8.52 | 40 | 48 | 2.9 | 3.31 | 700 | 60 | 99.3 |
| 20 | 4.26 | 6.0 | 0.335 | 2.07 | 6.39 | 40 | 48 | 3.0 | 4.31 | 912 | 60 | 97.5 |
| 21 | 4.26 | 6.0 | 0.267 | 1.65 | 5.11 | 40 | 48 | 3.9 | 5.31 | 1,174 | 60 | 100 |
| 22 | 4.26 | 6.0 | 0.192 | 1.18 | 3.65 | 40 | 48 | 4.5 | 7.31 | 1,644 | 60 | 100 |
| 23 | 4.26 | 6.0 | 0.221 | 1.37 | 4.26 | 40 | 48 | 4.6 | 6.31 | 1,392 | 60 | 98.9 |
| 24 | 0.854 | 1.20 | 0.013 | 0.078 | 1.0 | 40 | 72 | 3.7 | 21.5 | 1,203 | 248 | 99.2 |
| 25 | 25.56 | 36.0 | 2.46 | 15.2 | 1.0 | 250 | 78 | 16.2 | 2.35 | 22,592 | 1.27 | 66.0 |

TABLE I-continued

SYNTHESIS DATA AND PROPERTIES OF STARCH-ACRYLAMIDE, GRAFT COPOLYMERS

| Example Number | Acrylamide Added g Moles × 10² | | Water Soluble Starch Added g Moles[a] × 10³ | | Ceric Ion Moles Ce$^{+4}$ × 10⁵ | Solvent Volume (H₂O, ml) | Conditions Reaction Time (Hours) | [η] dl/g. | Calculated Product Properties[b] Molecular Weight × 10⁻⁶ | Dp | Ng | Percent Yield |
|---|---|---|---|---|---|---|---|---|---|---|---|---|
| 26 | 8.28 | 11.66 | 2.00 | 12.36 | 1.02 | 80 | 50 | 9.8 | 1.61 | 11,433 | 1.27 | 97.5 |
| 27 | 25.47 | 36.0 | 3.24 | 20.0 | 2.56 | 239 | 49.5 | 11.9 | 2.47 | 12,324 | 2.47 | 89.3 |

[a]Moles of glucose units
[b]Values calculated from equations described above. Molecular weight of starch calculated to be 313,000.

Starch-acrylamide copolymers are useful in increasing the viscosity of water and raise the viscosity of water between 2 and 1,000 fold when added to water in concentrations of between 0.01 and 2 weight percent. The preferred concentration range when viscosifying water through the practice of this invention is 0.01 to 0.3 weight percent. The capacity of these copolymers to increase the viscosity of water is illustrated by the data contained in Table 2.

TABLE 2

Viscosity of Aqueous Solutions of Starch-Acrylamide, Graft Copolymer

| Synthesis Product From Example Number | Concentration (Weight Percent) | Viscosity at 30° C. (cp) | Screen Factor at 25° C. (Dimensionless) |
|---|---|---|---|
| 4 | 0.5 | 75.71 | — |
| 4 | 0.4 | 28.65 | — |
| 4 | 0.3 | 12.66 | — |
| 4 | 0.25 | 8.45 | — |
| 4 | 0.2 | 5.43 | — |
| 4 | 0.15 | 3.84 | 30.03 |
| 4 | 0.125 | — | 28.45 |
| 4 | 0.10 | 2.46 | 24.58 |
| 4 | 0.075 | — | 21.03 |
| 4 | 0.05 | 1.46 | 15.39 |
| 4 | 0.025 | — | 10.38 |
| 5 | 0.15 | 2.63 | 15.9 |
| 5 | 0.125 | 2.21 | 10.76 |
| 5 | 0.10 | 1.83 | 9.86 |
| 5 | 0.075 | 1.51 | 9.2 |
| 5 | 0.05 | 1.24 | 7.61 |
| 5 | 0.04 | 1.13 | — |
| 5 | 0.03 | 1.04 | — |
| 5 | 0.025 | 0.994 | 5.98 |
| 5 | 0.02 | 0.952 | — |
| 5 | 0.01 | 0.871 | — |

Screen factor is the ratio of passage time of a polymer solution in a screen viscometer to the passage time of the solvent in the solution.

Figure 2:
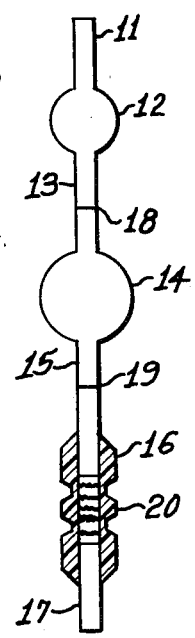
FIG. 2 is a schematic illustration of a screen viscometer used in testing solutions of the graft copolymers of this invention.

A screen visometer, shown in FIG. 2 is a glass apparatus for measuring the viscoelastic properties of a polymer solution. The apparatus consists of three parts. The upper part, labeled 11 to 15 in FIG. 2, is 0.25 o.d. glass tubing, identified at 11,13 and 15, connecting two bulbs, 12 and 14. The upper bulb, 12, is designed to contain a volume of approximately 20 ml and is connected, via 13, to bulb 14, designed to contain a volume of approximately 38 ml. The 0.25 inch o.d. glass tubes 13 and 15, are each marked at points, 18 and 19, such that between the two points and including bulb 14, there is contained a volume of 40 ml. Part 16 is a 0.25 inch, Swagelok union (part number NY-400-6) containing five 100-mesh, stainless steel screens 20. Part 17 is a 0.25 inch, o.d. glass tube. The length of parts 11-15 is 25 cm while that of part 17 is 6.5 cm.

A screen viscosity is determined at room temperature by connecting parts 11-15 to part 17 with the Swagelok union, 16, and suspending the apparatus in a suitable immobile clamp such that part 11 is held vertically above part 17 and the axis of both tubes, 11 and 17, would be in the same vertical line. The viscometer is filled by partially submerging part 17 in the fluid to be tested and applying suction until bulb 12 is half-filled. The suction is then released and the time is measured for the upper miniscus of the fluid to pass between points 18 and 19 under the pull of gravity. This is the passage time employed to calculate the screen factor mentioned above. Screen factor values of 10 or greater have been shown to correlate with the capacity of a polymer solution to reduce fingering in a water-flood and to improve oil recovery.

In employing the graft copolymer, the concentration thereof to be incorporated into an aqueous solution will depend upon the viscosity desired. The viscosity desired depends, in turn, upon the application of the viscous aqueous solution. The viscosities desired for various applications may run as low as 2 or 3 centipoises or up as high as 10,000 centipoises. Employing higher concentrations of graft copolymer results in higher viscosities of the aqueous solution. Because the graft copolymer is so effective in increasing the viscosity of the aqueous solution, a concentration thereof as low as 0.001 percent by weight affords significant increase in the viscosity of the aqueous solution. A concentration of from about 0.005 to 0.1 percent by weight of graft copolymer is adequate to afford the required viscosity in the aqueous solution for most purposes. For some uses, such as cosmetic formulations or in plugging an extremely permeable stratum in a subterranean formation as described hereinafter, concentrations as high as about 1.0 percent by weight, or greater, may be employed. At concentrations greater than about 2.5 percent by weight, extremely high viscosities are obtained and the solutions resemble gels.

One of the most significant applications for the viscous aqueous solutions is in the production of oil from a subterranean formation. In this application, the viscous aqueous solution is injected as a slug through an injection well into the oil-containing subterranean formation to help produce oil therefrom.

As is well known, the oil accumulated in subterranean formations is produced through wells drilled thereinto. After the first stage of production is completed, often referred to as primary depletion, much oil remains in the subterranean formation. One of the most widely used techniques to attempt to recover this remaining oil is the injection of a fluid through injection means, comprising one or more injection wells, into the formation. Oil is displaced from within the formation by the injected fluid and may be produced through production means, comprising one or more production wells, to the surface. The fluid which is injected through the injection means and into the formation tends to develop fingers and flow more readily through the more permeable sections of the subterranean formation than does the oil. As a result, the injected fluid breaks through, i.e., is produced, at the production well before the desired amount of oil has been displaced from within the subterranean formation and produced at the production well. One of the common injection fluids is water, in which case the operation is termed a waterflood. The injected water is termed flooding water.

The mobility of a slug of water can be tailored by increasing its viscosity to approach the mobility of the oil in the formation. By matching mobility, the tendency to finger is minimized and the viscous water thus enables recovery of a large percentage of the oil before breakthrough of the injected fluid occurs at the production well.

Inclusion of the graft copolymer of this invention in a portion of the flooding water does not require special equipment over that ordinarily employed in carrying out a waterflood. Improved solution viscosities can be obtained, however, if the copolymer is added to the flooding water by use of a polymer dispersing device such as a GACO Continuous Mix Polymer Feeder.

Such a mixer is well known in the practice of polymer water flooding. It dispenses the dry polymer onto a thin vortex of flooding water, thus ensuring a rapid and uniform dispersal of the polymer and preventing the formation of hydrated polymer gel particles, often called "fisheyes", which might plug the injection face of the formation.

When the viscous aqueous solution of the invention is employed in water-flooding a subterranean formation, a concentration of the graft copolymer as low as about 0.001 percent by weight of the flooding water affords appreciable increases in its viscosity and is beneficial. Preferably, a concentration of from about 0.005 to about 0.1 percent by weight of the graft copolymer is employed in the flooding water. Infrequently, it may be desirable to plug an extremely permeable stratum in a subterranean formation. In such instances, a slug of flooding water containing as high as 1.0 percent by weight, or more, of the graft copolymer may be employed to flow selectively into this more permeable stratum and reduce the permeability therein.

Ordinarily, the slug of flooding water containing the graft copolymer is in the amount of from about 0.01 to about 0.2 pore volume of the formation. Smaller sized slugs of flooding water from about 0.001 to about 0.01 pore volume containing up to 1.0 percent by weight or more of the graft copolymer may be employed in the event that plugging of an extremely permeable stratum is desired. The smaller sized slugs, when necessary, may be followed advantageously by the ordinary sized slugs of flooding water containing the lower concentration of the graft copolymer.

Starch-acrylamide, graft copolymers with between 1 and 18 grafts per starch molecule and a molecular weight between 1 and 5 million are particularly suitable for the polymer waterflooding of subterranean formations as shown by FIG. 1. FIG. 1 contains plots of values of intrinsic viscosity on the ordinate versus polymer or copolymer calculated molecular weight on the abscissa. Curve 1 represents intrinsic viscosity values of starch-acrylamide, graft copolymers of different molecular weight having 1.6 polyacrylamide grafts per starch molecule. Curve 2 represents intrinsic viscosity values of copolymers having 3.95 chains per starch molecule. Curve 3 represents intrinsic viscosity values of copolymers having 18.8 polyacrylamide chains per starch molecule. Curve 5 represents intrinsic viscosity values of copolymers having 38.3 polyacrylamide chains per starch molecule. Curve 4 is the relationship of intrinsic viscosity versus molecular weight of pure polyacrylamide, a material widely used in the oil recovery industry for polymer waterflooding. In view of its extensive history of application to oil recovery, polyacrylamide has been used as a reference material by which to judge the utility of starch-acrylamide graft copolymers for polymer waterflooding.

The slopes of Curves 1 and 2 are greater at all points than the slope of Curve 4, and the slope of Curve 3 is greater than that of Curve 4 for all points above 750,000 calculated molecular weight. Thus, starch-acrylamide graft copolymers give far higher intrinsic viscosities at lower calculated molecular weight than does acrylamide homopolymer. Further, as shown in Table 3, starch-acrylamide graft copolymers with Ng less than 18 impart higher viscosities and screen factors than an equal molecular weight acrylamide homopolymer. The data of Table 3 should be compared at points of equal concentration of the two polymers.

TABLE 3

VISCOSITY AND SCREEN FACTOR OF EQUAL MOLECULAR WEIGHT POLYACRYLAMIDE AND STARCH-ACRYLAMIDE, GRAFT COPOLYMER

| Synthesis Product of Example Number | Concentration (Weight Percent) | Viscosity at 30° C. (cp) | Screen Factor at 25° C. (Dimensionless) |
|---|---|---|---|
| 5 | 0.15 | 2.63 | 15.9 |
| 5 | 0.125 | 2.21 | 10.76 |
| 5 | 0.10 | 1.83 | 9.86 |
| 5 | 0.075 | 1.51 | 9.2 |
| 5 | 0.05 | 1.24 | 7.61 |
| 5 | 0.04 | 1.13 | — |
| 5 | 0.03 | 1.04 | — |
| 5 | 0.025 | 0.994 | 5.98 |
| 5 | 0.02 | 0.952 | — |
| 5 | 0.01 | 0.871 | — |
| Polyacrylamide Homopolymer[a] | 0.15 | 1.137 | 1.013 |
| Polyacrylamide Homopolymer[a] | 0.125 | 1.075 | 1.003 |
| Polyacrylamide Homopolymer[a] | 0.1 | 1.015 | 0.994 |
| Polyacrylamide Homopolymer[a] | 0.075 | 0.955 | 1.003 |
| Polyacrylamide Homopolymer[a] | 0.05 | 0.901 | 0.994 |
| Polyacrylamide Homopolymer[a] | 0.04 | 0.880 | 0.984 |
| Polyacrylamide Homopolymer[a] | 0.03 | 0.860 | 1.003 |
| Polyacrylamide Homopolymer[a] | 0.025 | 0.846 | 0.994 |
| Polyacrylamide Homopolymer[a] | 0.02 | 0.836 | 1.003 |
| Polyacrylamide Homopolymer[a] | 0.01 | 0.818 | 0.994 |

[a]The polyacrylamide homopolymer is a 1.8 million molecular weight polymer with an intrinsic viscosity of 5.0. The polymer was synthesized by the method described in the article by Hirro Tanaka, J. Polym. Sci., Polymer Letters Edition, 16, 87–89 (1978). The polymer was synthesized in 4 hours at a temperature of 40° C. using $10.1 \times 10^{-2}$ moles of acrylamide and $1.0 \times 10^{-6}$ moles of initiator in 35g of distilled, deionized water.

Viscous aqueous solutions of starch-acrylamide, graft copolymer can also be used as a fracturing fluid to increase the permeability of a subterranean formation. In such a process, a viscous solution of the copolymer is made by dissolving the copolymer in water, brine, or a suitable mixture of solvents. Solvent mixtures useful in the preparation of a fracturing fluid normally contain at least 50 percent water by weight. The remaining portion of the solvent is a liquid capable of forming strong hydrogen bonds. Representative liquids are low molecular weight alcohols, such as methanol, ethanol, or propanol, tetrahydrofuran, or low molecular weight diols. The use of solvents other than water or aqueous saline solution should generally be avoided since a given concentration of copolymer will produce a lower viscosity in a solvent mixture than it will produce in brine.

Dissolution of the copolymer in brine does not necessarily require special equipment or special methods. Improved solution viscosities can be obtained, however, if the copolymer is added to the flooding water by use of a polymer dispersing device such as a GACO Continuous Mix Polymer Feeder, described above.

The properties of solutions of starch-acrylamide graft copolymer make them uniquely suited for use in a process for fracturing the rock around a borehole. This process comprises introducing the composition into the borehole, raising the pressure in the borehole to a range in which the rock fractures, maintaining the pressure for a given period, and releasing the pressure. The composition can thereafter be removed from the borehole. Pressures at which fracturing of the rock occurs vary in accordance with the nature of the rock. Generally, pressures at which fracturing is achieved are about 1 pound per foot of vertical depth depending upon the formation. The pressure in the borehole is usually maintained for a period of time of about ¼ hour to 6 hours, depending on the formation and fluid loss characteristics of the fracture fluid.

In order to prevent the rock from closing the fissures produced by the fracturing, it can be advantageous to incorporate so-called "propping agents" into the fracturing composition. Such propping agents preferably are sand, glass beads, or metal pellets, the most desirable being sand. The fluid of this invention has the advantage of supporting and carrying these propping agents, essentially preventing a settling of these agents. Thus, the propping agents are effectively introduced into the fissures or cracks formed in the rock. The propping agents generally are employed in the composition of this invention for the fracturing in concentrations of about ½ pound to about 10 pounds per gallon of fracturing fluid.

In accordance with still another embodiment of this invention, there is provided a method for cleaning a borehole during the drilling process. This method comprises introducing a composition of this invention into the borehole, removing the composition now containing cuttings from the borehole, and letting this composition settle at the surface in a tank, or the like, to release the cuttings, and recovering at least a portion of the composition. The invention advantageously provides a highly viscous fluid to be introduced into the borehole, which effectively removes the cuttings from the borehole. The polymer solution has the additional advantage that it can be displaced from the borehole by conventional drilling fluids or it can be diluted by conventional drilling fluids to yield a solution with a viscosity proximate to that of the drilling fluid.

EXAMPLES 28–31

Tests have been run to determine the capacity of a solution of graft copolymer in water to support a proppant. The proppant used in these tests was pure quartz sand that had been sieved through a 100 mesh, ASTM standard screen. The copolymer sample used in these tests was a 2.5 weight percent solution of the product of Example 10 dissolved in deionized water. The results of the test are presented in Table 4 as Examples 28 to 31.

The tests for proppant support capacity were conducted by placing a thoroughly mixed sample of polymer solution and sand in an 18 mm diameter tube. The mixture was allowed to stand for a measured time and the polymer-sand suspension was decanted away from the precipitated sand. The suspension was filtered, washed and dried at 50° C. in a vacuum oven. The amount of sand maintained in suspension by the polymer solution was calculated from the difference in filter weight produced by filtering the sand suspension.

Because injection rates and depth of the petroleum-bearing zone below the surface of the earth vary from one fracturing treatment to another, no single time can be given as the time a fracturing fluid must support a proppant in order to deliver it to the subterranean formation. However, elapsed times of 15 minutes to one hour are common between preparation of a proppant suspension and the delivery of the suspension to the formation. Therefore, the data of Table 4 show that starch-acrylamide graft copolymer solutions function effectively as suspending media for proppants.

TABLE 4

LISTING OF THE AMOUNT OF SAND SUSPENDED BY A SOLUTION OF STARCH-ACRYLAMIDE GRAFT COPOLYMER AS A FUNCTION OF TIME

| Example Number | Proppant Mass Fraction (Kg/Kg) | Suspension Density (Kg/Barrel) | Initial Proppant in Suspension (Kg/Barrel)[1] | Percent Proppant Supported (%) | Time (Minutes) |
|---|---|---|---|---|---|
| 28 | .0955 | 168.362 | 16.079 | 66.03 | 15 |
| 29 | .0993 | 168.758 | 16.757 | 28.52 | 30 |
| 30 | .1002 | 168.852 | 16.919 | 59.32 | 45 |
| 31 | .0993 | 168.758 | 16.757 | 47.86 | 60 |

[1] 1 barrel = 42 U.S. Gallons = 158.982 liters

In still another embodiment of this invention the graft copolymer of starch-acrylamide is employed to reduce friction encountered in the flow of fluids through conduits.

It is well known that the resistance of a liquid to turbulent flow can be considerably reduced by the addition of certain materials to the liquid. The phenomenon, commonly known as drag reduction, has been observed with substances such as soaps and fibers (Patterson et al., Ind. Engr. Chem. 61, 22 (1969). Drag reduction has found several applications in commercial and military fields. It has been successfully used in firefighting, sewage disposal, transportation of fluids through long pipelines and in reducing drag in the flow of liquids past submerged vessels. It has been found that by incorporating 0.1 to 100 ppm (by weight) of the graft copolymers of this invention into water or other liquid flowing through a pipe, the friction can be reduced.

EXAMPLES 32–34

The extent to which starch-acrylamide graft copolymers reduce drag was investigated with a special apparatus. The apparatus consisted of a 50 ml buret equipped with a Teflon stopcock, a 0.25 to 0.125 inch, Swagelok reducing union, and 2 meters of 0.125 inch o.d., nylon tubing. The buret tip was replaced with a 0.25 inch o.d. glass tube. The buret was connected to the nylon tubing by the nylon reducing union. The buret and 0.25 meters of tubing were mounted vertically and the remaining 1.75 meters of nylon tube were mounted in a straight, horizontal line. The tests for drag reduction were conducted by determining the time required for the miniscus of the tested fluid to pass between the 1 ml and 21 ml marks on the furet once the test apparatus was filled with fluid and the stopcock opened.

Measurements were then made for polymer solutions and water and percent drag reduction was defined as $$\% DR = 100 (t_w - t_p)/t_w$$

where $t_w$ = average efflux time for water, and $t_p$ = average efflux time for polymer solution by measuring $t_p$ at different polymer concerntrations, drag reduction was determined as a function of concentration.

The results of the tests for drag reduction capacity in starch-acrylamide, graft copolymers are given in Table 5. These results show that drag reductions of up to 17 percent can be achieved at copolymer concentrations as low as 3 to 4 wppm. When these data are plotted and a smooth curve applied to the plotted data it shows a maximum drag reduction effect at a copolymer concentration of about 3.5-4.0 wppm.

TABLE 5

Reduction of Drag in the Flow of Water Caused By The Addition of Starch-Acrylamide Copolymer

| Example Number | Fluid | Graft Copolymer Concentration[1] (wppm) | Passage Time[2] (Seconds) | Percent of Drag Reduction (%) |
|---|---|---|---|---|
| 32 | Water | 0 | 35.63 ± 1.01 | 0 |
| 33 | Copolymer Solution | 3.72 | 29.3 ± 0.49 | 17.75 |
| 34 | Copolymer Solution | 6.10 | 33.48 ± 3.35 | 6.02 |

[1]The copolymer used in this test was the product of Example 5.
[2]Passage times given are the means of 4 determinations.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. Water-soluble graft copolymer comprising a backbone molecule of water-soluble starch with branch chains grafted thereto of polymerized acrylamide units or a mixture of polymerized acrylamide units and polymerized acrylic acid units.

2. The graft copolymer of claim 1 wherein all of said branch chains are polymerized acrylamide.

3. The graft copolymer of claim 1 which has the property of increasing the viscosity of water from 2 to 1000 times that of pure water when dissolved in water at concentrations of 0.001 to 2.0 weight percent.

4. The graft copolymer of claim 1 having a molecular weight of 300,000 to 20,000,000.

5. The graft copolymer of claim 3 in which the molecular weight is 1,000,000 to 5,000,000 and each starch molecule has 1-18 of said grafted branch chains.

* * * * *